United States Patent [19]

Logan et al.

[11] Patent Number: 4,547,786
[45] Date of Patent: Oct. 15, 1985

[54] INK JET PRINTING SYSTEM

[75] Inventors: David J. Logan, Glastonbury; Kenneth O. Wood, Ellington; Thomas A. Gordon, Glastonbury; John E. Ladue, Tolland, all of Conn.

[73] Assignee: Metromedia, Inc., Secaucus, N.J.

[21] Appl. No.: 637,151

[22] Filed: Aug. 2, 1984

[51] Int. Cl.⁴ .................... G01D 15/18; G01D 15/34; H04N 1/46
[52] U.S. Cl. ................... 346/140 R; 346/134; 358/77
[58] Field of Search .............. 346/134, 140 PD; 358/77

[56] References Cited

U.S. PATENT DOCUMENTS

| | | | |
|---|---|---|---|
| 2,278,940 | 4/1942 | Murphy | 358/77 |
| 3,092,686 | 6/1963 | Johnson | 358/77 |
| 3,553,371 | 1/1971 | Suenaga | 358/77 |
| 4,463,361 | 7/1984 | Koumura et al. | 346/134 |

*Primary Examiner*—George H. Miller, Jr.
*Attorney, Agent, or Firm*—McCormick, Paulding & Huber

[57] ABSTRACT

An ink jet printing system suited to the making of large scale graphics, such as outdoor billboards, includes an endless carrier for moving a plurality of rigid flat panels, onto which a graphic is to be printed in sections, repetitively past an ink jet printing station. At the printing station each panel moves in purely rectilinear fashion in a direction parallel to its ink drop receiving face so that such face remains essentially at a uniform spacing from the ink jet printing heads of the printing station as the printing occurs. A means for timing the operation of the ink jet heads takes into account irregularities or changes in the motion of the panels past the printing station so that the ink drops are correctly placed despite such irregularities or changes. The ink jet heads can eject relatively large drops of pigmented ink. In the case of polychromatic half-tone printing, for each pixel of a panel different colors are printed at substantially different times so that the printed ink drops of one color can dry before those of another color are printed, and a heating means may be used to enhance the drying.

21 Claims, 12 Drawing Figures

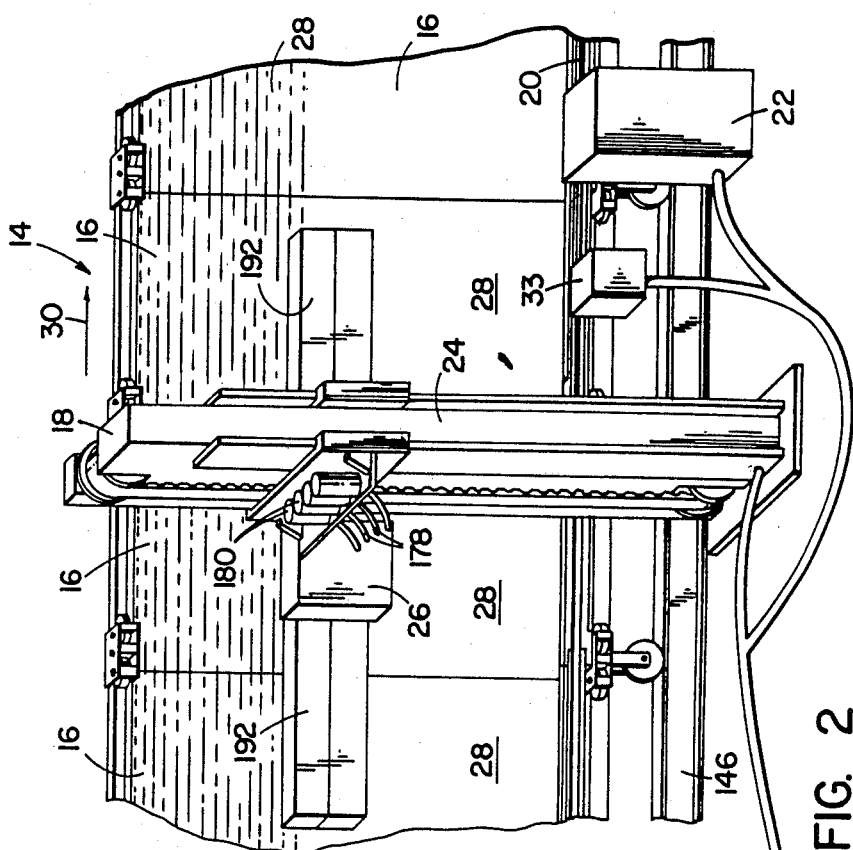
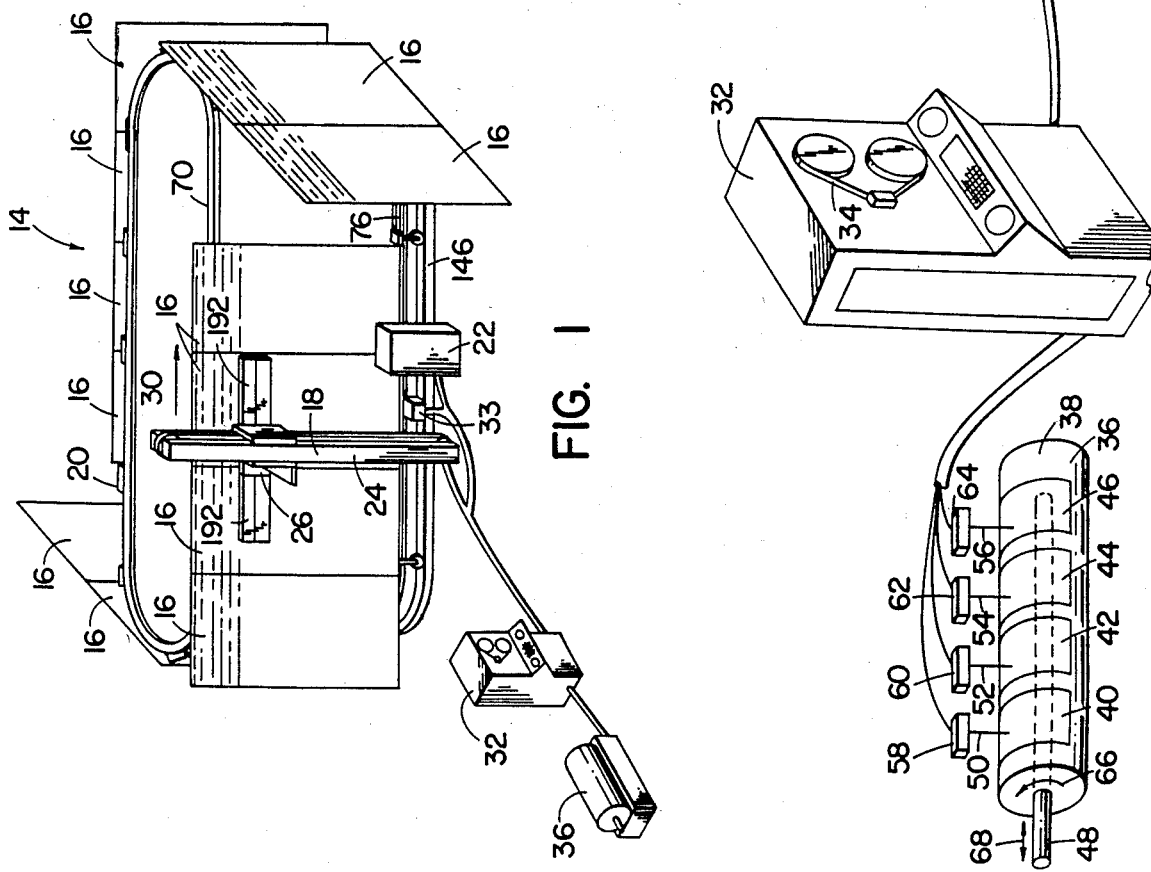
FIG. 1
FIG. 2

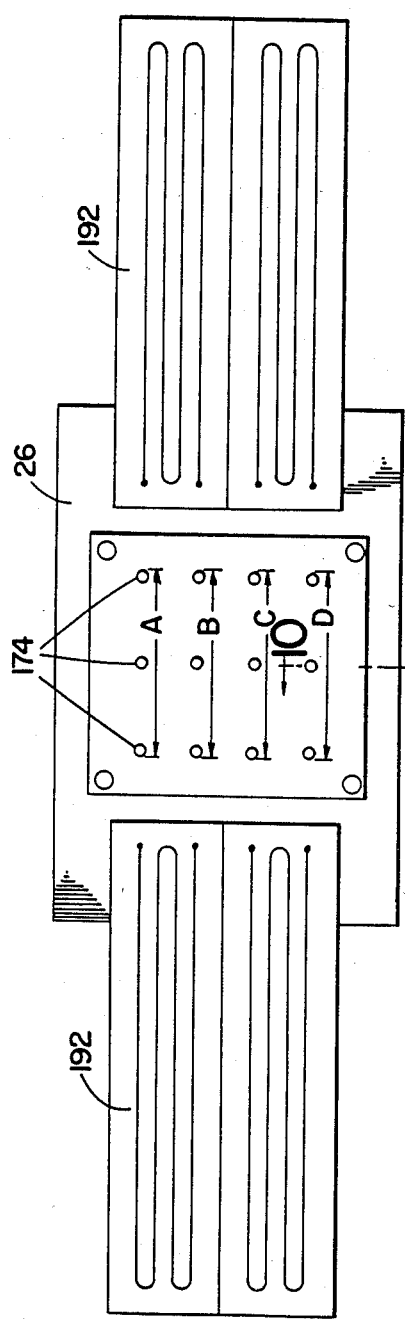
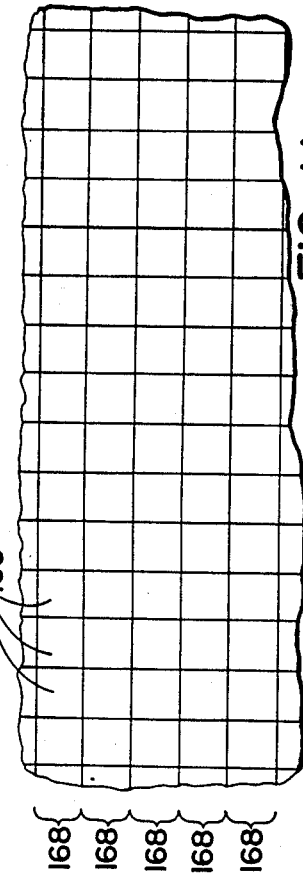
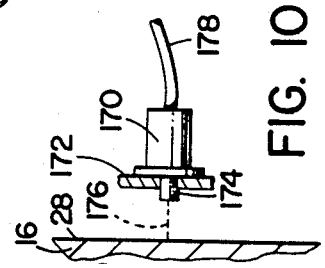
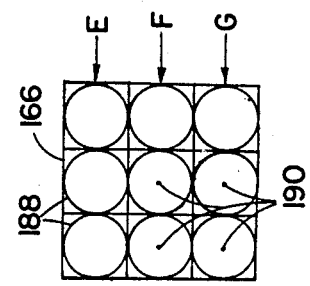
FIG. 9
FIG. 10
FIG. 11
FIG. 12 and 4,547,786

INK JET PRINTING SYSTEM

BACKGROUND OF THE INVENTION

This invention relates to ink jet printing and deals more particularly with an ink jet printing system especially suited to printing large graphics such as outdoor advertising billboards and signs or displays for use in railway or airport terminals, shopping malls and other open public areas.

Heretofore large graphics of good quality have been difficult, time consuming and expensive to produce. The most attractive billboards, for example, are often painted by hand, which is obviously a slow process. Where printing and other mechanical techniques are employed large amounts of time are generally required to prepare for the actual printing or other involved mechanical process, making it essentially impossible to produce a large graphic at reasonable expense on short order.

A general aim of the invention is therefore to provide a system for producing graphics, particularly large-scale colored ones, of high quality at reasonable expense, with a further aim being to provide such a system usable to produce graphics on relatively short order thereby permitting the production and hanging of graphics referring to very recent events.

These general aims are achieved in accordance with the invention, and as described in more detail hereinafter, by an ink jet printing system having at least one and preferably more ink jet printing heads which print onto a plurality of flat rigid panels moved successively past the printing head or heads along an endless path with the printing heads preferably being ones which eject relatively large volume drops of pigmented ink onto the panels to create the desired graphic, each panel having printed onto it only a portion of the total graphic and a plurality of panels being placed side-by-side after the printing to collectively form the graphic.

Other objects and advantages of the invention will be apparent from the following detailed description of a preferred embodiment and from the accompanying drawings.

SUMMARY OF THE INVENTION

The invention resides in an ink jet printing system wherein a graphic is produced by printing onto a plurality of rigid panels intended to be placed side-by-side to form the overall display. The panels are moved edgewise and rectilinearly in succession past an ink jet printing station by an endless carrier to cause each ink jet printing head of the printing station to scan a line on each panel as it passes the printing station, and each ink jet printing head is moved in a direction perpendicular to the path of panel movement, in coordination with the panel movement, so that with each revolution of a panel along the endless path the printing head is moved a given increment to cause it to scan a new line on the panel each time it passes the printing station.

The invention also resides in the structure of the carrier for moving the panels past the printing station, in the drive for propelling such carrier, in the control of the operation of the printing head or heads in dependence on the carrier position, on the arrangement of the ink jet printing heads, and on the utilization of a heating means to cause, in a polychromatic half-tone mode of printing, the drying of ink drops of one color applied to a pixel before ink drops of another color are applied to the same pixel.

BRIEF DESCRIPTION OF THE DRAWING

FIG. 1 is a schematic perspective view showing an ink jet printing system embodying the invention.

FIG. 2 is an enlarged fragmentary perspective view showing in more detail the printing and control stations of the FIG. 1 system.

FIG. 9 is a view taken on the line 9—9 of FIG. 3 showing the arrangement of the ink jet printing heads and heaters at the printing station of the FIG. 1 system.

FIG. 10 is a view taken on the line 10—10 of FIG. 9 showing one of the ink jet printing heads of the printing station.

FIG. 11 is an enlarged fragmentary view showing a portion of a panel surface and illustrating the manner in which such surface is divided into pixels through the operation of the system of FIG. 1.

FIG. 12 is an illustration showing the arrangement of potential ink drop locations within one of the pixels of FIG. 10.

DETAILED DESCRIPTION OF THE PREFERRED EMBODIMENT

Figure 3:
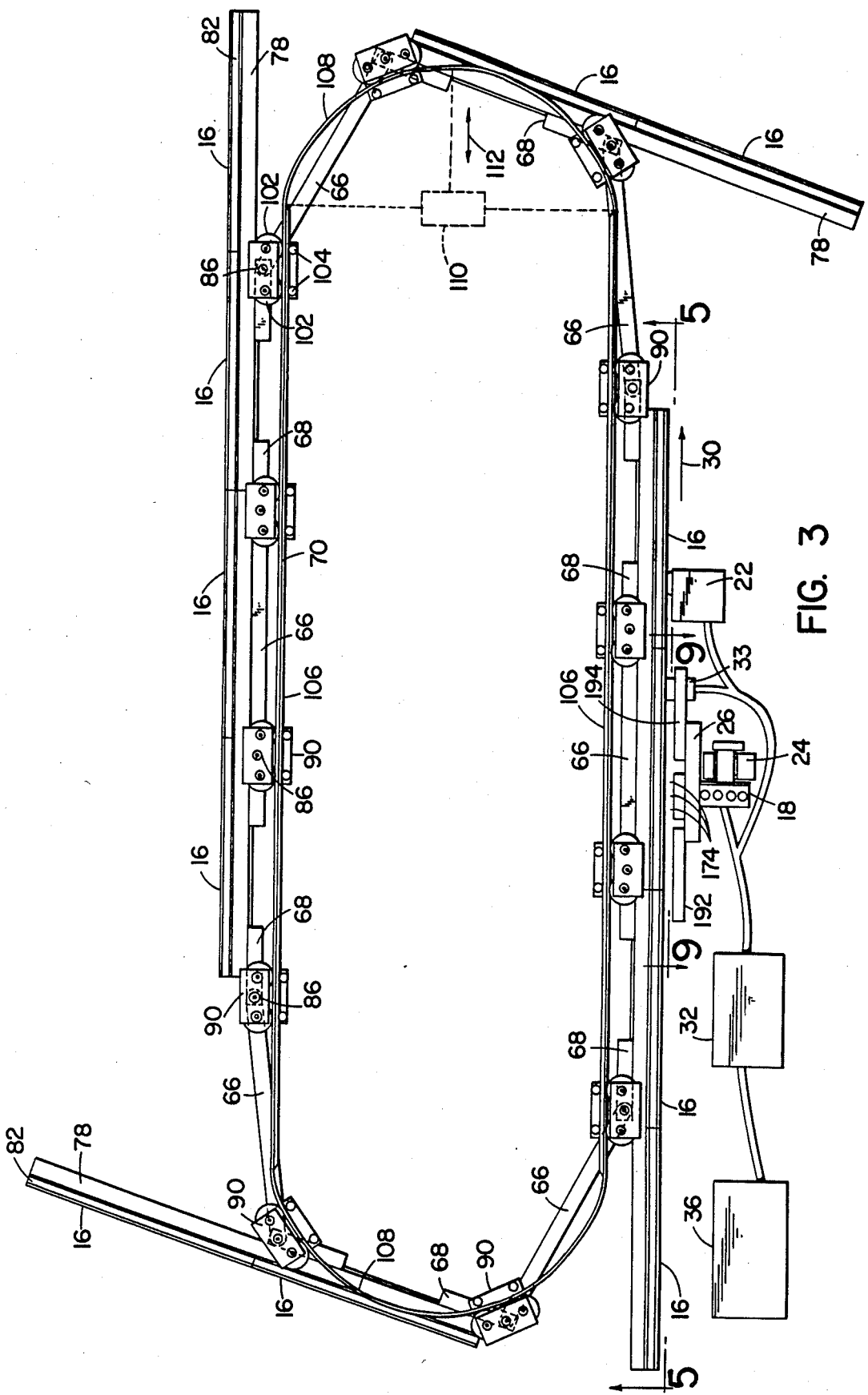
FIG. 3 is a top plan view of the FIG. 1 system.

Referring to FIGS. 1 and 2, these figures show an ink jet printing system 14 embodying the invention consisting of a means for moving a plurality of flat panels 16, 16 in an endless path and edgewise and rectilinearly in succession past an ink jet printing station 18. This panel moving means includes an endless carrier 20 supported by tracks, as hereinafter explained in more detail, and propelled by a power unit 22 located near the printing station 18. The printing station 18 includes a vertical column 24 slidably supporting a carriage 26 for vertical movement relative to the column, the carriage 26 in turn supporting at least one ink jet head for printing ink drops onto the outwardly directed major face 28 of each panel 16 as it passes the printing station. The panels 16, 16 are of generally rectangular shape and are held on the carrier 20 with the major face 28 of each panel oriented vertically. During operation of the system the panels move in the direction of the arrow 30, and each ink jet printing head of the printing station ejects ink drops onto the faces of the panels, with the drops in moving from the nozzle to a panel moving along a substantially horizontal line of flight, so that each time a panel passes the printing station the drops ejected by a printing head, if it is operated at that time, fall on a horizontal scan line. Further, the vertical movement of the carriage 26 and of the carrier 20 is coordinated so that with each full revolution of the carrier about its endless path the carriage 26 is moved downwardly by a given increment so that each time a panel passes the printing station each ink jet printing head of the printing station scans a line on the panel which is new to it.

The operation of the ink jet printing heads and the movement of the carriage 26 is controlled by a computerized controller 32. Timing of the excitation of the printing heads is slaved to the motion of the carrier through an encoder unit 33 including a carrier position encoder and a once per revolution signal means associated with the carrier 20 as explained in more detail hereinafter. Graphics information controlling the excitation of the ink jet printing heads to cause each head to either print or not print a drop at each potential drop location on the surface of each panel may be supplied to the controller 32 in various different ways. For example, it may be in the form of preprocessed information recorded onto a magnetic tape 34 read by the controller, or it may be supplied by a scanner 36 associated with the controller 32.

A scanner to provide graphic input information to the controller 32 may also take many different forms. By way of illustration the scanner 36 is shown as one adapted for use in printing in a four color polychromatic half-tone manner. It includes a transparent drum 38 onto which four color separation negatives 40, 42, 44 and 46 may be mounted in registration with one another, each negative being a continuous tone one prepared from the original artwork to be reproduced on the panels 16, 16. That is, the negative 40 may be a block separation negative, the negative 42 a cyan separation negative, the negative 44 a magenta separation negative, and the negative 46 a yellow separation negative. Within the drum 38 is a device 48 emitting four laser beams 50, 52, 54 and 56 passing through respective ones of the separation negatives and detected by associated photodetectors 58, 60, 62 and 64. The drum 38 is rotatable about its central axis in the direction of the arrow 66 and the four laser beams 50, 52, 54 and 56 are movable in unison along the axis of the drum as indicated by the arrow 68. Each time the panel carrier 22 undergoes one full revolution the scanner executes one read cycle during which it reads one line of information from the negatives 40, 42, 44 and 46. In each such cycle the drum 38 is rotated a small increment and the laser beams 50, 52, 54 and 56 are then moved across the negatives 40, 42, 44 and 46 to produce information from the detectors 50, 52, 54 and 56 processed by the controller 32 to control the operation of the ink jet printing heads during one revolution of the carrier 20. The controller 32 includes a buffer memory for temporarily storing one or more lines of information from the detectors 58, 60, 62 and 64, so that during one revolution of the carrier the information used to excite the printing heads is information obtained by the scanner 36 and processed by the controller 32 during a preceding revolution of the carrier.

Figure 4:
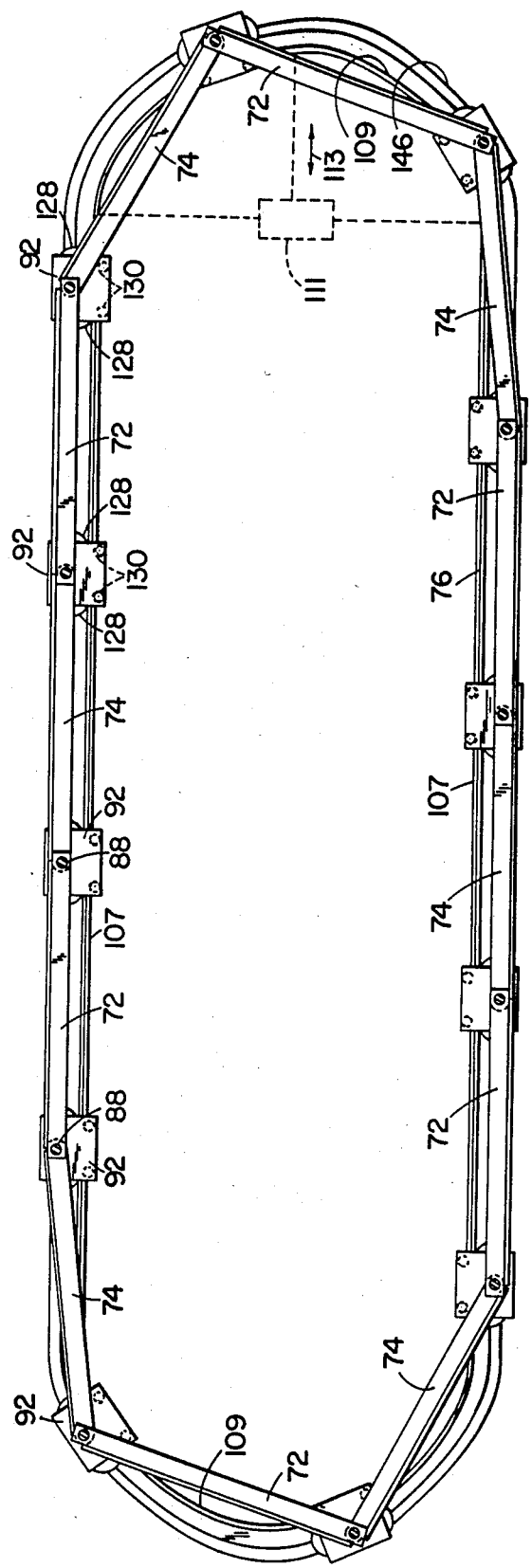
FIG. 4 is a horizontal sectional view of the panel moving means of the system of FIG. 1 taken on the line 4-4 of FIG. 5.
Figure 5:
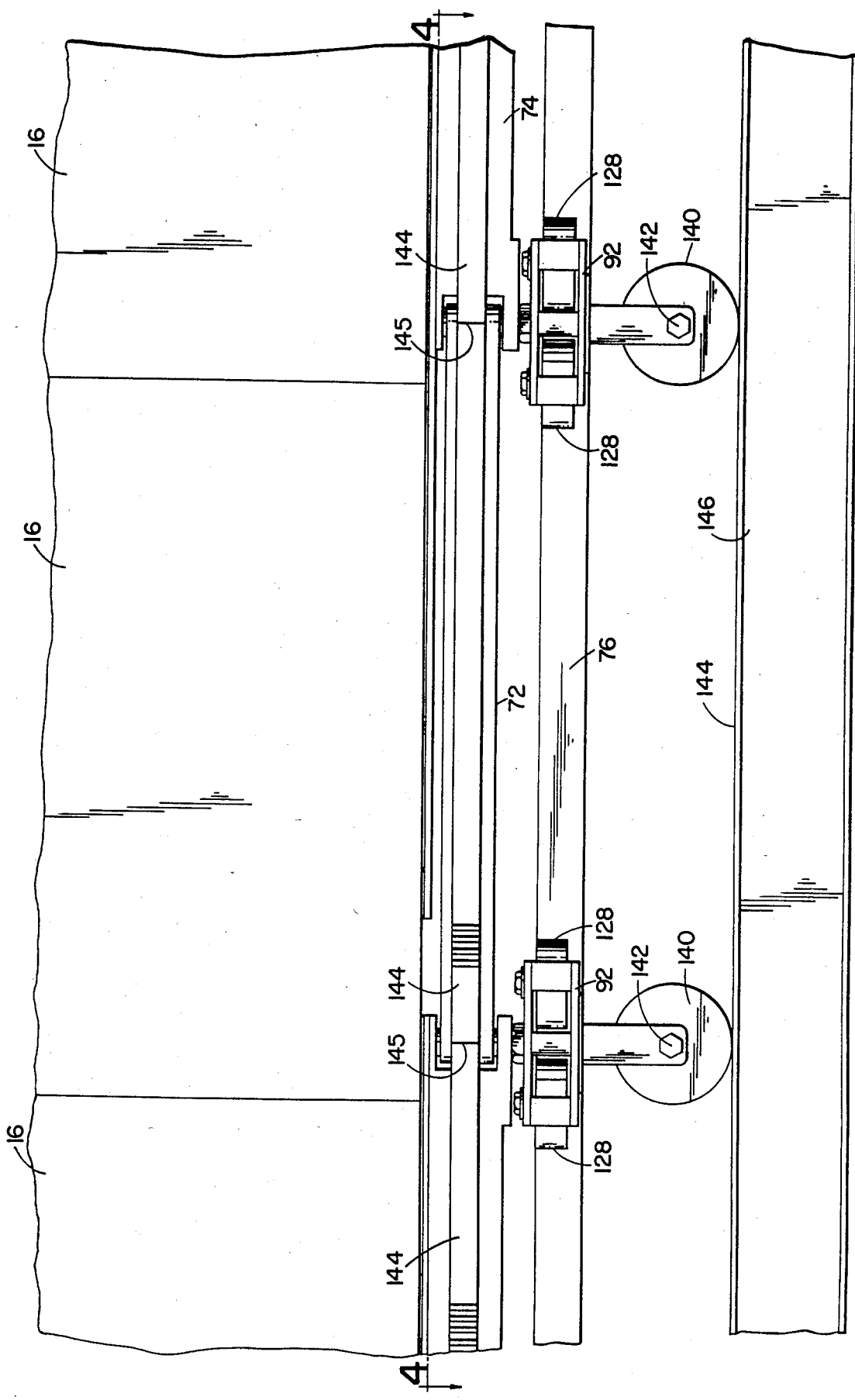
FIG. 5 is an enlarged fragmentary vertical view, taken on the line 5—5 of FIG. 3, showing a lower portion of the panel moving means.
Figure 6:
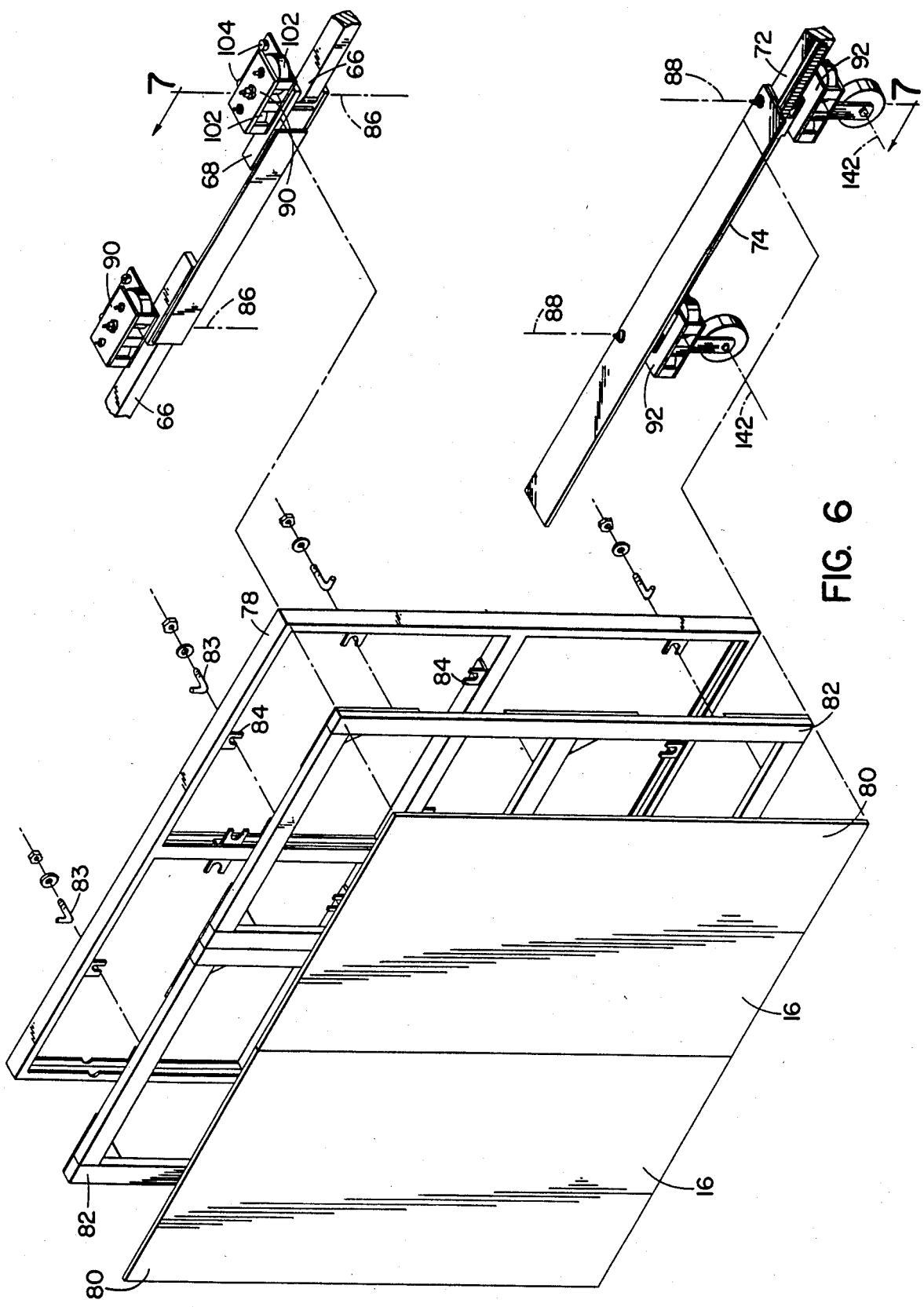
FIG. 6 is an exploded perspective view showing the construction of a portion of the panel moving means of FIG. 1.
Figure 7:
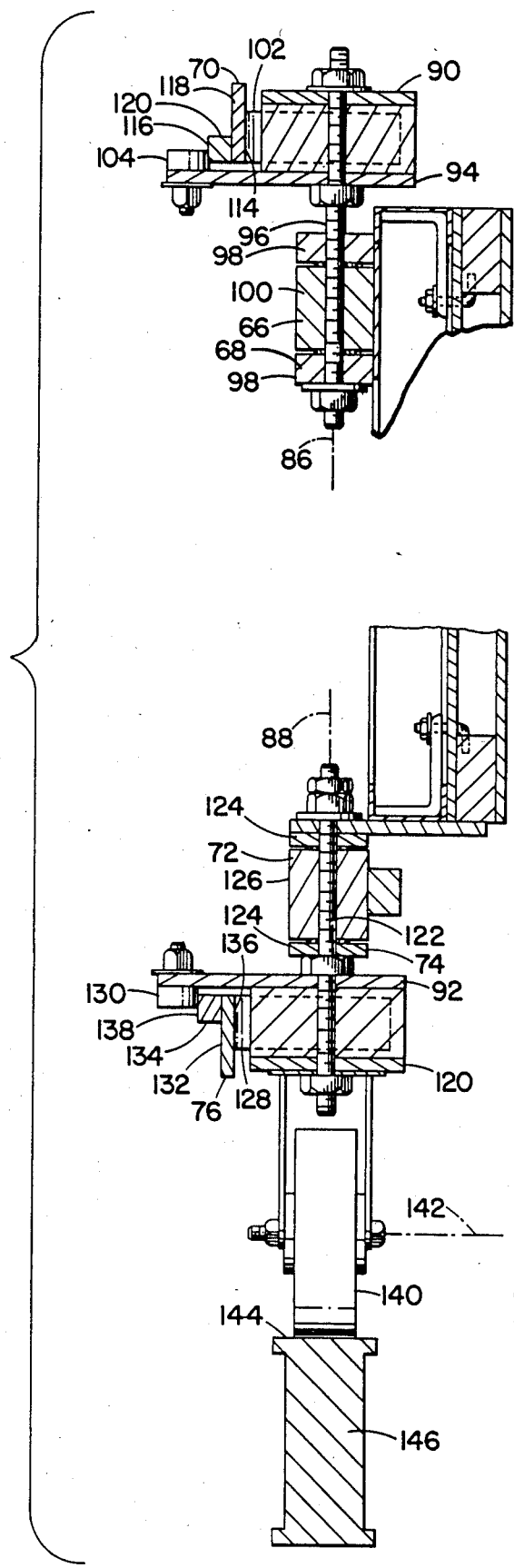
FIG. 7 is a vertical sectional view taken on the line 7—7 of FIG. 6, but with the parts being shown in their assembled condition.

FIGS. 3 to 7 show in more detail the construction of the carrier 20 and its supporting tracks. Referring to these figures, the carrier 20 includes an upper set of links 66, 68 pivotally connected end-to-end to form an upper chain associated with an upper endless track 70 (as best seen in FIG. 3), a set of bottom links 72, 74 pivotally connected end-to-end to form a bottom chain associated with a bottom endless track 76 (as best seen in FIG. 4), and a plurality of rigid rectangular panel supporting frames 78, 78 each extending vertically from a bottom link 68 to an upper link 74 (as best shown in FIGS. 6 and 7). Each panel frame 78 is welded or otherwise rigidly connected to its lower link 68 and welded or otherwise rigidly connected to its upper link 74 so that the upper and lower sets of links are drivingly connected with one another for movement in unison along the lower and upper tracks 76 and 70 by the panel frames. The upper and lower tracks 70 and 76 are rigidly supported from the floor or ground of the building in which the system is located by an appropriate framework which may take any convenient form and which is omitted from the drawings for purposes of clarity.

As seen in FIG. 6 each panel frame 78 is made essentially as a weldment of channel sections and is sized to accommodate two panels 16, 16. Each panel 16 may, for example, have a size of four feet by eight feet with each panel frame 78 therefore having a nominal size of eight feet by eight feet. Instead of carrying two separate four feet by eight feet panels 16, 16 each panel frame 78 may also be used to carry a single eight foot by eight foot panel if desired.

The illustrated carrier 20 includes six panel frames 78, 78 and therefore, if the frames are eight feet by eight feet in size, can be used to create a graphic having a maximum length of forty-eight feet and a heighth of eight feet. Of course the printing performed on such eight foot by forty-eight foot area need not be the total graphic. For example, the upper half of a graphic may be printed on twelve four feet by eight feet panels 16, 16 during one run of the system and the lower half printed on another set of twelve four by eight panels during another run of the system, and then the panels of the two sets may be arranged on top of one another to form a complete graphic of maximum sixteen feet by forty-eight feet size.

The panels 16, 16 may be made of any suitable material and may, as shown in FIG. 6, each consist of a relatively thin sheet 80 of plywood or fiberboard nailed to a rigidizing wooden frame 82. The frame 82 may remain with its panel 80 after the printing process and be used to hang the panel as part of the overall graphic. During the printing process each panel 80 and its frame 82 is held to the associated panel supporting frame 78 of the carrier by suitable removable fasteners such as angle bolts 83, 83 cooperating with lugs 84, 84 on each panel supporting frame 78.

If desired, the carrier 20 may also be used to print on more flexible sheets such as thin sheets of paper or plastic. In this case panels such as the panels 16, 16 may be permanently associated with the carrier and sheets of paper or other material may be temporarily fastened to such panels for transport past the printing station during the printing process.

The links 66, 68 of the upper chain alternate with one another and are joined end-to-end for pivotal movement relative to one another about vertical pivot axes 86, 86; and the links are of uniform length as measured between the pivot axes 86, 86. Likewise, the links 72, 74 of the bottom chain alternate with one another and are pivotally connected end-to-end for movement relative to one another about vertical pivot axes 88, 88, with the links 72 and 74 being of the same uniform length as the links 66 and 68. Further, the connection of the upper set of links with the lower set of links through the panel supporting frames 78 is such that each pivot axis 86 is colinear with an associated pivot axis 88. In the upper set of links 66 and 68 the links 68, 68 are ones which are bifurcated at their ends and the links 66, 66 are ones which are not bifurcated, as seen in FIG. 6. Likewise in the lower set of links, the links 74, 74 are ones which are bifurcated at their ends and the links 72, 72 are ones which are not bifurcated.

The pivot axes 86, 86 of the upper chain are laterally restrained to movement along the upper track 70 by twelve trucks 90, 90 each associated with one of the pivot axes 86, 86; and likewise the pivot axes 88, 88 of the lower set of links are laterally restrained to movement along the lower track 76 by twelve trucks 92, 92 each associated with one of the axes 88.

Referring to FIGS. 3, 6 and 7, each upper truck 90 includes a body 94 supported for rotation about the associated vertical axis 86 by being pivotally supported on the same pin 96 as pivotally connects together the bifurcations 98, 98 of the associated link 68 and the end portion 100 of the associated link 66. Rotatably supported on each truck 90 for rotation about vertical axes relative to the body 94 is a first pair of rollers 102 and 104, located in advance of the associated axis 86 with regard to the direction of truck movement, and a second pair of rollers 102 and 104, located behind the associated axis 86 with regard to the direction of truck movement. The track 76 has two straight sections 106, 106 joined by two generally semicircular end sections 108, 108 to give it its endless form. By a means illustrated schematically in FIG. 4 at 110 the right-hand end section 108 is movable to the left or right, as indicated by the arrow 112 to slightly vary the length of the path provided by the track to suit it to the length of the chain formed by the links 72, 72. By this means the slack existing in the chain may be taken up. As shown in FIG. 7 along each straight section 106, 106 the track 76 has two opposed vertical faces 114 and 116 provided respectively by a bar 118 and a bar 120. The spacing between the opposed faces 114 and 116 is such that the two wheels 102, 102 of the truck engage the surface 114 at the same time as the other two wheels 104, 104 engage the surface 116. Therefore, the four wheels prevent any lateral movement of the axis 86 relative to the track 76. At each end section 108, 108, however, the inner bar 120 is omitted so the trucks can move more freely along such end sections.

The bottom track 76, like the top track 70, has two straight sections 107 and two generally semicircular end sections 109, 109, the right one of which end sections 109, 109 is adjustable right and left, as indicated by the arrow 113, by a means 111, to take up the slack in the lower chain of links 72 and 74. Each bottom truck 92, as seen in FIGS. 4, 6 and 7, is generally similar to an upper truck 90 and comprises a body 120 pivotally supported for movement about the associated vertical axis 88 by being pivotally supported on the same pin 122 as forms the pivotal connection between the associated bifurcations 124, 124 of the link 74 and the end portion 126 of the link 72. The body 120 carries, for movement about vertical axes relative to the body, a first pair of wheels 128, 130 located in advance of the axis 88, with regard to the direction of movement of the truck, and another pair of wheels 128 and 130 located behind the axis 88, with regard to the direction of movement of the truck along the track. Along each straight section 106, 106 of the track, the track is formed by two bars 132, 134 providing opposed vertical faces 136, 138 spaced apart by exactly the spacing between a pair of wheels 128 and 130, thereby preventing lateral movement of the truck 92 relative to the track. Along the end sections 109, 109, however, the bar 134 is omitted to permit the trucks to move more freely.

Each truck 92 also carries a lower wheel 140 supported from the body 120 of the truck for rotation about a horizontal axis passing through the associated vertical axis 88 and arranged generally perpendicular to the track 76. The wheels 140, 140 of all twelve trucks 92, 92 ride on an upwardly facing support surface 144 located below the track 76 and provided by a rail 146 resting on the floor or ground. The wheels 140, 140 in conjunction with the rail 146 therefore provide the vertical support for the remainder of the carrier 20.

If the end sections 108 and 109 are exactly semicircular in shape, because of the fixed relatively long length of the links 66, 68, 72 and 74, and the fixed length of both chains of links, the trucks 90 and 92 will not remain in unforced contact with the end sections of the track as they move along such sections. Therefore, the end sections are of a special shape, deviating slightly from a semicircle, designed such that all trucks remain in contact with the end sections and all other parts of the tracks at all other points of their movement therealong with undue lateral binding forces being applied to the trucks.

From the foregoing description of the carrier 20 it will be evident that the panels 16, 16 as they pass the printing station 18 are moved horizontally in purely rectilinear movement with each panel moving in a direction parallel to its major face on which the printing is to occur and that lateral movement of the panels is inhibited so that a substantially uniform spacing is maintained between each printing head of the printing station and the associated panel surface. The two panels 16, 16 carried by each panel frame 78 are held with their adjacent vertical edges close to one another so as to present substantially no gap in the printing surface. Similarly, adjacent panel frames 78, 78 are so arranged on the links, and the links are of such length, that when two panel frames 78, 78 are located in the same plane the trailing vertical edge of the trailing panel 16 of the leading panel frame 78 closely abuts the leading vertical edge of the leading panel 16 of the trailing frame 78 so that again substantially no gap appears in the printing surface. The printing station therefore essentially sees a continuous flat surface located in a single vertical plane passing it, yet the construction of the carrier allows the panel frames to pivot about vertical axes relative to one another, as illustrated by FIGS. 1 and 3, to permit their movement along the endless path.

Furthermore, to assure that the printing station does continuously see a flat planar printing surface the upper straight section 106 of the upper track and the lower straight section 107 of the lower track adjacent the printing station 18 have a length at least as long as and preferably slightly longer than the length of two panel frames. In a more general way it should be noted that the minimum length of straight track sections required to achieve purely planar movement of the panels past the printing station is related to the lengths of the panel frames and that the number of links per panel frame may vary. That is, the lengths of the straight track section should be at least twice the length of each panel frame and each panel frame may have one or some other integral number of links associated with it in each of the upper and lower chains. If each panel frame 78 has a length measured along the endless path of movement of N times the length of one of the links 66, 68, 72, or 74, with N being an integer, there will be NX links in each chain where X is the number of panel frames 78, 78. Therefore, of the links in the two chains only every Nth link is connected to a respective one of the frames. In the illustrated case, each panel frame is of a length two times that of the length of a link, there are six panel frames 78, 78 in the system and there are a total of twelve links in each of the top and bottom chains. In the upper chain every link 68 is connected to a panel frame with the intervening links 66, 66 not being connected to a frame. In the bottom chain every link 74 is connected to a panel frame while the intervening links 72, 72 are unconnected to any panel frame.

Figure 8:
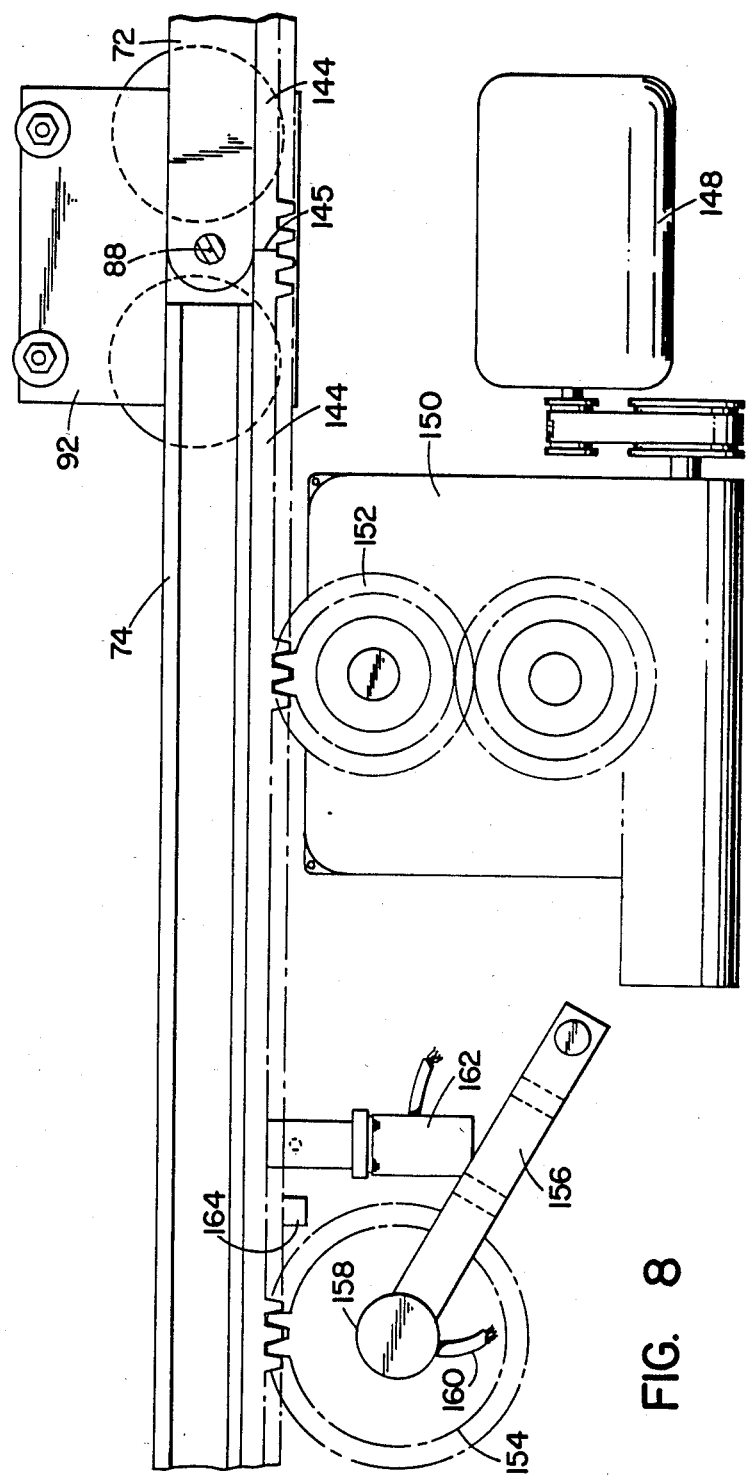
FIG. 8 is an enlarged plan view of the power and encoding units of the system of FIG. 1.

The drive for moving the carrier 20 along the endless path defined by the upper and lower tracks 70 and 76 is best illustrated by FIGS. 5 and 8. Referring to these figures, each link 72 and 74 of the lower chain has a laterally outwardly directed face to which is attached a rack section 144. The arrangement of the rack sections 144, 144 as best seen in FIG. 5 is such that when the adjacent links are moving along a straight section of the tracks, as when passing the printing station 18, the power unit 22 and the encoder unit 33, the adjacent rack sections 144, 144 are positioned end to end and form essentially a continuous straight rack. During assembly of the system, when the rack sections 144, 144 are mounted to the links 72 and 74 a third rack section may be temporarily pressed into the teeth of two adjacent rack sections to serve as a locating guide assuring accurate positioning of the teeth of one rack section with those of the adjacent section. The joint between two successive rack sections 144, 144 is indicated at 145 in FIG. 8 and is located on a plane containing the vertical axis 88 and oriented perpendicular to the lengths of the two adjacent links 72 and 74.

The power unit 22, as seen in FIG. 8, includes an electric motor 148 and a speed reducing unit 150 having an output pinion 152 engageable successively with the rack sections 144, 144 to propel the carrier 20 along its endless path.

In the operation of the system of FIG. 1 the controller 32 energizes the power unit 22 to propel the carrier 20 in the direction 30 at substantially a desired speed. This speed may vary, as when starting or stopping a run, or when stopping and restarting the carrier during a run, and slight irregularities in the speed of any one of the panel supporting frames 78, 78 may occur due to looseness in the pivotal connections making up the upper and lower chains. To avoid printing errors due to these changes in the speed of the carrier or irregularities in the motion of any one panel supporting frame, the excitation of the ink jet printing heads of the printing station 18 is controlled by signals from the encoder unit 33 associated with the carrier 20 and located close to the printing station 18. Preferably, and as illustrated, the encoder unit 33 is located less than the length of one link 66, 68, 72 or 74, from the printing station 18 so that no more than one upper and lower set of link pivot joints occur between the encoder and the printing station. Thus any discrepancy in panel position encountered by the printing station and panel position encoded by the encoder unit is limited to the looseness, if any, between such one set of pivot joints.

The encoder unit 33, as shown in FIG. 8, more particularly includes a pinion 154 carried by a supporting frame 156 and arranged to successively meshingly engage the rack sections 144, 144 as they pass thereby. Mounted on the frame 156 is a shaft encoder 158 which encodes the angular position of the pinion 154 and accordingly the position of the carrier 20 along its endless path, the output of the encoder 158 being delivered to the controller 32 through the line 160. Also included in the encoding unit 33, as shown by FIG. 8, is a means for providing a signal once per revolution of the carrier 20 about its endless path to represent the start of each new cycle of operation. This means may take various different forms, but in the illustrated case is shown as a photodetector 162 mounted adjacent the path of movement of the links 72, 74 of the lower chain and operable to detect the leading edge of a single index tab 164 attached to one of such links.

The printing station 18 of the system of FIG. 1 may be equipped with only a single ink jet printing head, or with several such heads all printing the same color, to produce a monochromatic graphic. However, the system preferably is used to generate polychromatic graphics and for this reason is equipped with ink jet printing heads for printing either three colors (cyan, magenta and yellow) or four colors (cyan, magenta, yellow and black) in a polychromatic half-tone manner such as generally described in prior U.S. Pat. No. 4,367,482. One or more printing heads may be used for each color. By way of example, however, in the following discussion it is assumed that the printing station 18 has twelve ink jet printing heads for printing four different colors, there being three heads for printing black, three for printing cyan, three for printing magenta, and three for printing yellow. It is also assumed that the half-tone printing process involved uses square pixels measuring one-tenth inch on a side. As shown in FIG. 11 the pixels are indicated at 166, 166, and are arranged end-to-end in successive side-by-side horizontal bands 168, 168. Each band 168 represents effectively the amount of printing performed by all of the printing heads during one revolution of the carrier 20, but as explained hereafter, all four colors are not printing onto the same band 168 during the same carrier revolution. Instead, during one carrier revolution the four colors are individually printed onto four separate bands 168, 168 vertically separated from one another.

FIG. 9 shows the arrangement of the discharge nozzles of the twelve ink jet printing heads and FIG. 10 shows generally the outward appearance of one of the heads 170. The head 170, as are all eleven other of the heads, is mounted to a mounting plate 172 with its nozzle 174 extending through the plate and directed to the passing surface 28 of a panel 16 so that an ink drop ejected from the nozzle 74 moves from the nozzle to the surface 28 along a generally horizontally line of flight 176. The printing head 170 may be of various different types but preferably is a piezo-electric activated drop-on-demand one capable of ejecting relatively large volume drops of pigmented ink. Preferably all twelve of the heads included in the printing station are of a construction similar to that shown by the patent application filed concurrently herewith entitled INK DROP EJECTING HEAD in the name of Leonard G. Rich.

As shown in FIG. 9 the twelve nozzles 174, 174 of the printing station are arranged three each in four vertically spaced horizontal rows A, B, C and D. The three nozzles of each row print a different color. That is, the three nozzles of row D may be ones which print yellow colored drops, the three nozzles of row C may print magenta colored drops, the three nozzles of row B may print cyan colored drops and the three nozzles of row A may print black colored drops. The appropriate colored ink is supplied to each printing head by a supply tube 178 connected to a supply reservoir 180 mounted on the carriage 26. In FIG. 2 only a few of the lines 178, 178 have been shown for purposes of clarity.

As shown in FIG. 12, each pixel 166, which is one-tenth of an inch square, contains nine ink drop locations, represented generally by the circles 188, 188, having centers 190, 190, the centers 190 therefore being spaced 0.033 inches from one another along both horizontal and vertical lines. In each pixel there are three horizontal rows E, F and G each containing three ink drop locations 188, 188. Although not evident in FIG. 9, the three nozzles 174, 174 of each row A, B, C and D are vertically spaced from one another by a distance of 0.033 inches so that as a receiving surface passes the printing station the three nozzles 174, 174, of a row such as the row D, if operated, print ink dots respectively along the three different lines E, F and G of the associated band 168 of pixels. That is, in each row, as viewed in FIG. 9, the left nozzle 174 may be the lowest one, the middle nozzle may be positioned 0.033 inches above the left one, and the right nozzle may be the highest one and positioned 0.033 inches above the middle one. Therefore, in each pixel the left nozzle 174 will print the lower row G of drop locations, the middle nozzle will print the middle row F of drop locations and the right nozzle will print the upper row E of drop locations. Of course, each drop location of a pixel is printed only if desired in accordance with the graphic information supplied to the controller 32. The horizontal spacing between the pixel locations appearing on a row E, F or G is determined by the slaving of the printer head excitation to the movement of the carrier and such excitation is such that each time the carrier moves 0.033 inches relative to the printing station a decision is made as to whether or not each printing head 170 is to be actuated.

As also evident from FIG. 9 the four rows A, B, C and D of nozzles 174, 174 are spaced vertically from one another. This means that during one revolution of the carrier 20 the nozzles of the row D will print yellow colored dots along one low pixel band 168. The nozzles of the row C will print magenta drops along another band 168 spaced upwardly from the low band, and the nozzles of row B and the nozzles of row A will likewise print respectively cyan drops and black drops along two other bands 168, 168 spaced still further above the low band. Therefore, after one band 168 is printed with yellow drops that same band will not be printed with magenta drops until the carrier 20 executes a number of revolutions dependent on the spacing between the nozzle rows C and D and on the heighth of each pixel. For example, as mentioned the heighth of each pixel is one-tenth inch and in the illustrated case the vertical spacing between the rows A, B, C and D may be two inches. Therefore, the carrier will have to execute twenty revolutions between the time a band 168 is printed with yellow drops and the time the same band is printed with magenta drops, it being assumed that during the printing process the carriage 26 of the printing station is moved from top to bottom and incremented downwardly 0.100 inches per revolution. At full speed the carrier 20 may move at a rate equal to fifteen seconds per revolution and therefore a period of five minutes will elapse between the printing of different colors on a given band 168. That is, for a given pixel of a given band the pixel will first be printed with dots of yellow; five minutes later it will be printed with dots of magenta; five minutes later it will be printed with drops of cyan; and finally five minutes later it will be printed with drops of black. This delay in the printing of a pixel with the different colors advantageously allows the drops of one color to dry before drops of another color are applied. If the drops are not dried the pigments of the drops may mix and produce an undesired muddy color.

In further accordance with the invention the drying of the drops of one color ink before drops of another color are applied may be enhanced by heating the panels 16, 16 and the drops after their application. This heating may be accomplished in various different ways but in the illustrated case is performed by two radiant heaters 192, 192 attached to the carriage 26 at the same level as the group of nozzles 174, 174 and arranged on either side of the nozzle group as shown in FIG. 9 to direct heat into the passing panel surfaces 28, 28.

We claim:

1. An ink jet printing system for printing onto a plurality of substantially flat panels, said system comprising: panel moving means for moving a plurality of flat panels in succession along an endless path, means providing an ink jet printing station located at one point along said endless path, said ink jet printing station having at least one ink jet printing head arranged and operable to sequentially eject drops of ink onto said panels as they move past said printing station so that as each panel passes said printing station said ink jet head scans a scan line on said panel extending parallel to said path of panel movement along which ink drops will appear if said ink jet head is operated to eject ink drops onto said panel at that time, and means for moving said at least one ink jet printer head in the direction perpendicular to said path of panel movement and in coordination with the movement of said panel moving means so that each time a panel passes said printing station said at least one ink jet head scans a new scan line on said panel.

2. An ink jet printing system as defined in claim 1 wherein said at least one ink jet printing head ejects drops of pigmented ink.

3. An ink jet printing system as defined in claim 1 for printing onto a plurality of substantially flat panels each having a major face for receiving drops of ink, further characterized by said panel moving means being such that at said printing station each panel moves in a purely rectilinear fashion in a direction parallel to its major face so that its major face remains substantially uniformly spaced from said at least one printing head as it passes said head.

4. An ink jet printing system as defined in claim 1 further characterized by said means for moving said at least one ink jet printer head in the direction perpendicular to said path of panel movement and in coordination with the movement of said panel moving means including an index marker attached to said carrier, a marker sensing means fixed relative to said printing station for sensing said index marker each time it passes said sensing means and for producing an output signal indicating such sensing of said index marker, and means responsive to said output signal for moving said ink jet printer head a given increment in the direction perpendicular to said path of panel movement.

5. An ink jet printing system as defined in claim 1 for printing onto a plurality of substantially flat panels each having a major face for receiving drops of ink, further characterized by said panel moving means being such that the panels moved by it move in a horizontal direction with their major faces vertical and parallel to the direction of movement.

6. An ink jet printing system as defined in claim 5 for printing onto a plurality of substantially flat rectangular panels, further characterized by said panel moving means being adapted to hold each of said panels with two of its opposed edges vertical and its other two opposed edges horizontal, said endless path including a straight portion, and said panel moving means further being such that as two successive panels move along and are simultaneously parallel to said straight portion of said endless path the trailing vertical edge of the leading one of said two successive panels abuts the leading vertical edge of the trailing one of said two successive panels, said printing station being located along said straight portion of said endless path.

7. An ink jet printing system as defined in claim 1 further characterized by said printing station including a plurality of ink jet printing heads fixed relative to one another and each ejecting ink of a different color, said plurality of heads being spaced from one another in the direction perpendicular to said path of panel movement so that when ink drops of one color are printed along one scan line ink drops of another color will not be printed along the same scan line until said panels make a given number of traverses of said endless path, and heating means arranged to heat said panels to assist in drying the drops of one color ink applied to a scan line before drops of another color ink are applied to the same scan line.

8. An ink jet printing system as defined in claim 7 further characterized by said printing station including a carriage supported for movement in the direction perpendicular to said path of panel movement onto which carriage said plurality of ink jet heads are mounted to effect their movement in said direction perpendicular to said path of panel movement, and said heating means including at least one heater attached to said carriage for movement in unison with said ink jet heads and arranged to direct heat onto the panels passing said printing station.

9. An ink jet printing system as defined in claim 1 further characterized by said panel moving means including an articulated carrier to which panels may be attached for movement with said carrier, means supporting said carrier for movement along said endless path, and drive means for propelling said carrier along said endless path.

10. An ink jet printing system as defined in claim 9 further characterized by an encoder for encoding the position of said carrier along said endless path, and means responsive to said encoder for timing the ink drop ejecting operation of said at least one ink jet head of said printing station.

11. An ink jet printing system as defined in claim 10 further characterized by said articulated carrier including at least one set of equal length links arranged end-to-end and pivotally connected to one another at their adjacent ends to form and endless chain of links, said endless path having a straight portion at least as long as two of said links, and said means for propelling said carrier being a plurality of rack sections each fixed to and extending along the length of a respective one of said links, said rack sections being arranged relative to their associated links so that when two adjacent links travel along and parallel to said straight portion of said endless path the rack section of the trailing one of said two adjacent links forms a continuation of the rack section of the leading one of said two adjacent links, and a power unit located along said straight portion of said endless path and having a powered pinion engaged successively with said rack sections of said links as they pass said power unit to propel said chain of links along said endless path.

12. An ink jet printing system as defined in claim 11 further characterized by said encoder means being located at one point along said straight portion of said endless path and including an encoder pinion engaged successively with said rack sections as they move past said encoder means, and an encoder for encoding the angular position of said encoder pinion.

13. An ink jet printing system as defined in claim 12 further characterized by said said ink jet printing station also being located along said straight line portion of said endless path and arranged so that said ink jet head is spaced from said encoder, as measured parallel to said straight portion of said endless path, by a distance no greater than the length of one of said links.

14. An ink jet printing system as defined in claim 9 further characterized by said articulated carrier including a lower set of equal length lower links arranged end-to-end and pivotally connected to one another at their adjacent ends for movement about vertical axes to form a lower endless chain of links, an upper set of upper links of length equal to that of said lower links arranged end-to-end and pivotally connected to one another at their adjacent ends for movement about vertical axes to form an upper endless chain of links, said lower chain being located in a first horizontal plane and said endless chain of upper links being movable in a second horizontal plane spaced above said first horizontal plane, and a plurality of vertical panel supporting frames each having a lower end connected to one of said lower links and an upper end connected to a corresponding one of said upper links.

15. An ink jet printing system as defined in claim 14 further characterized by said upper links being so arranged relative to said lower links that the vertical axis about which two adjacent lower links are pivotally connected is colinear with the vertical axis about which an associated adjacent two of said upper links are pivotally connected.

16. An ink jet printing system as defined in claim 14 further characterized by each of said panel frames being adapted to support a rectangular panel having a length measured along said endless path of movement of N times the length of one of said links, where N is an integer, there being NX links in each chain, where X is the number of said panel frames, and of said links in each of said chains only every Nth link being connected to a respective one of said frames.

17. An ink jet printing system as defined in claim 16 further characterized by N being equal to 2.

18. An ink jet printing system as defined in claim 14 further characterized by said carrier means including a lower endless track located in a horizontal plane and associated with said lower chain, an upper endless track located in another horizontal plane and associated with said upper chain, a plurality of upper trucks connecting said upper chain to said upper track for movement therealong, and a plurality of lower trucks connecting said lower chain with said lower track for movement therealong.

19. An ink jet printing system as defined in claim 18 further characterized by adjacent ones of said upper links being pivotally connected to one another for movement about a vertical axis, and adjacent ones of said lower links being pivotally connected to one another for movement about a vertical axis, each of said upper trucks being associated with a respective one of the pivotal connections of said upper set of links and being pivotally connected to the two associated upper links for movement relative to both of said upper links about a main vertical axis colinear with the vertical axis about which said two upper links are connected to one another, each of said lower trucks being associated with a respective one of the pivotal connections of said lower set of links and being pivotally connected to the two associated lower links for movement relative to both of said lower links about a main vertical axis colinear with the vertical axis about which said two lower links are connected to one another, said upper and lower tracks each having two opposed vertical guide faces, each of said upper and lower trucks having two pairs of rollers rotatable about vertical axes relative to the truck, the first pair of said rollers being located in advance of the associated main axis with respect to the direction of movement of said truck along said endless path and the other pair of said rollers being located behind said main axis with respect to the direction of movement of said truck along said endless path, and the two rollers of each of said pairs of rollers engaging said opposed faces of the associated one of said tracks to allow each truck to roll along its associated track while preventing movement of the trucks laterally of the track.

20. An ink jet printing system as defined in claim 18 further characterized by means providing an upwardly facing support surface located below and along said lower track in a horizontal plane, and each of said lower trucks having a wheel rotatable about a horizontal axis and engaging said support surface to vertically support said lower truck.

21. An ink jet printing system as defined in claim 18 further characterized by said upper track and said lower track each having two horizontally spaced parallel straight sections joined by two semi-circular end sections, and means for adjustably moving one end section of each of said tracks in a direction parallel to said straight sections.

* * * * *